March 16, 1926.
F. SCHLATTERER
TENON MILLING MACHINE
Filed August 11, 1925
1,576,849
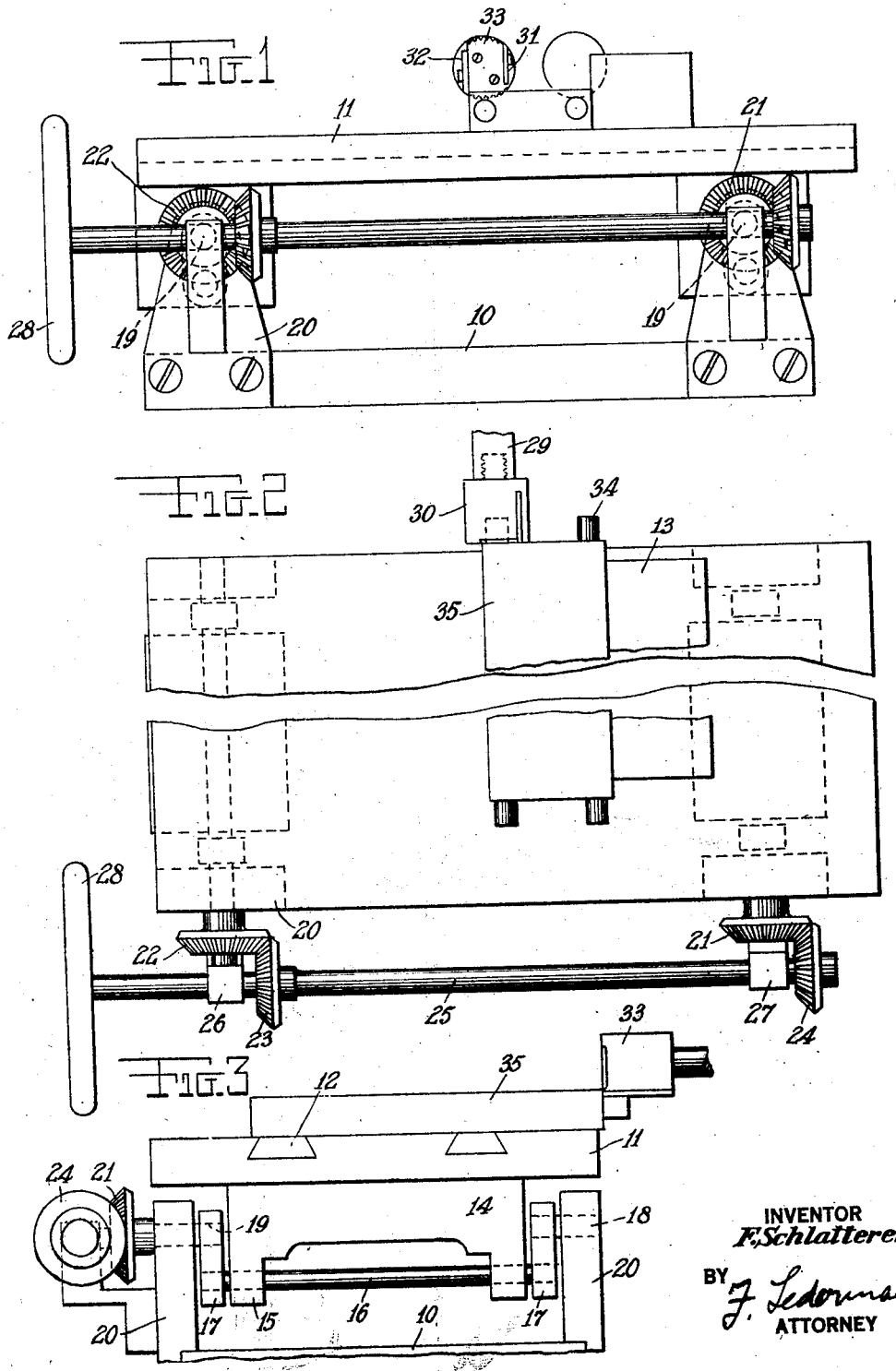
INVENTOR
F. Schlatterer
BY
ATTORNEY Patented Mar. 16, 1926.

1,576,849

UNITED STATES PATENT OFFICE.

FRED SCHLATTERER, OF NEW YORK, N. Y.

TENON-MILLING MACHINE.

Application filed August 11, 1925. Serial No. 49,518.

*To all whom it may concern:*

Be it known that I, FRED SCHLATTERER, a citizen of Germany, residing at New York, in the county of New York and State of New York, have invented certain new and useful Improvements in Tenon-Milling Machines, of which the following is a specification.

The main object of this invention is to provide a tenon milling machine in which the main characteristic is that the work revolves around the cutter which also revolves on a stationary axis. This invention has for its main purpose to provide a machine whereby a plurality of tenons may be formed upon a piece of work simultaneously on the same machine. The tenon milling machines heretofore in use were constructed so that the piece of work to be milled was chucked and rotated beside a cutter to form a tenon thereon. This invention provides a table on which a plurality of work pieces may be clamped and at a position where a tenon is to be formed, a rotating cutter is mounted, the cutter being of the same radius as the rotating throw of the table so that the piece of work clamped on the table describes a circle around the cutter and in this manner accomplishes its work by forming a circular tenon at any position along the length of a piece of work.

The above and other objects will become apparent in the description below, in which characters of reference refer to like-named parts in the drawing.

Referring briefly to the drawing, Figure 1 is a side elevational view of the tenon milling machine.

Figure 2 is a top plan view of the same.

Figure 3 is an end elevational view of Figure 1.

Referring in detail to the drawing, the numeral 10 indicates a base plate upon which the entire device is mounted. The milling machine essentially consists of a circularly moving table 11 having dovetailed channels 12 therein in which guide blocks 13 are slidable. The table at each end has a downwardly extending bracket 14 from which projections 15 depend. Thru these projections, a shaft 16 passes and projects from both sides thereof. The projecting ends of the shaft are rotatably journaled in eccentric bars 17, which are longitudinal in outline and have their opposite ends fixedly mounted on a short stud 18 and a somewhat longer stud 19. The studs 18 and 19 project inwardly from the sides of pedestals 20 which support the floating table 11 and all its attached parts. One of these pedestals is mounted on each corner of the rectangular base plate 10, and from the two which face one side of the base plate, those in which the studs 19 are rotatable, are provided with means for causing the table to move in a circular path. The studs 19 project from the sides of the pedestals 20, and to these projecting ends, a pair of bevel gears 21 and 22 are secured. These bevel gears are in continual mesh with additional bevel gears 23 and 24 which have their rotational axis positioned at right angles to the first-named gears 21 and 22 and are mounted to a spindle 25 which is supported in arms 26 and 27 attached to the sides of the pedestal 20 and has a hand wheel 28 fixed to one end. The base plate is mounted upon and in front of a machine having a head which rotates on a fixed axis, such as the head of a lathe or the like. The spindle of such a lathe is indicated by the numeral 29 and rotates adjacent one edge of the floating table 11. To this spindle, an arbor body 30 is secured or chucked, and this arbor body must be a definite radius, the diameter thereof being equivalent to half the throw of the eccentric bars 17. On the sides of this arbor, a pair of blades 31 and 32 are fixed and have their cutting edges facing in opposite directions, the bottom of the arbor or end thereof having an additional cutter 33 which is adapted to form a shoulder at the bottom of a tenon projection 34 of a piece of work 35.

When these cutters are mounted in rotating members or spindles, a plurality of tenons 34 may be formed simultaneously. A piece of material such as wood or the like is firmly clamped upon the floating table 11 in such a manner that one end projects somewhat from the side of the table at which the cutting arbors 30 are positioned. The hand wheel is then rotated. In rotating this hand wheel and spindle 25, the gears 23 and 24 are consequently also rotated and these gears being in mesh with the additional gears 21 and 22, rotate the studs 19. As the studs 19 are fixed to one end of the eccentric bars 17, the latter are swung radially, describing a circular arc whose center is the axis of the arbor or cutter 30. The shafts 16 are rotatably carried in the free ends of the eccentric bars 17, and as the entire floating table 11 is supported on these shafts, the table is caused to swing circularly about the cutter. By simply clamping a piece of material such as wood at a position below one or more cutters 30, tenons such as 34 may be formed on the projecting ends thereof, the cutting members performing the work of trimming the projecting portion of the material into tenon-like shape simultaneously with the circularly swinging table 11.

I claim:—

1. A tenon milling machine comprising a rotating cutter mounted on a fixed axis, a circular swinging table adapted to swing around said cutter, pedestals beneath said table, eccentric bars supported on said pedestals, shafts connecting said table and eccentric bars, and means for rotating said eccentric bars.

2. A tenon milling machine comprising a rotating cutter mounted on a fixed axis, a circular swinging table adapted to swing around said cutter, pedestals beneath said table, eccentric bars supported on said pedestals, shafts connecting said table and eccentric bars, studs supporting said eccentric bars, bevel gears on said studs, and a spindle and additional bevel gears meshing with the first-named gears for rotating the studs to revolve the floating table around the cutters.

3. A tenon milling machine comprising a circular rotating cutter mounted on a fixed axis, a circularly swinging table having the same throw as the diameter of said cutter, pedestals beneath said table, eccentric bars rotatably supported on said pedestals, shafts mounted in said eccentric bars supporting said table, studs supporting said eccentric bars, bevel gears rigid with said studs and a spindle mounted on said pedestals extending across said pedestals, gears at both ends of said spindle meshing with the first-named bevel gears, and a hand wheel on said spindle for rotating the latter.

In testimony whereof I affix my signature.

FRED SCHLATTERER.